(12) United States Patent
Jensen et al.

(10) Patent No.: US 8,068,975 B2
(45) Date of Patent: Nov. 29, 2011

(54) DETERMINING AN ESTIMATE OF THE WEIGHT AND BALANCE OF AN AIRCRAFT AUTOMATICALLY IN ADVANCE AND UP TO THE POINT OF TAKE-OFF

(75) Inventors: Michael Wayne Jensen, Grapevine, TX (US); Jeffrey A. Darnell, Mansfield, TX (US); Charles F. Wilkinson, The Colony, TX (US)

(73) Assignee: American Airlines, Inc., Fort Worth, TX (US)

( * ) Notice: Subject to any disclaimer, the term of this patent is extended or adjusted under 35 U.S.C. 154(b) by 1246 days.

(21) Appl. No.: 11/742,898

(22) Filed: May 1, 2007

(65) Prior Publication Data
US 2007/0255489 A1    Nov. 1, 2007

Related U.S. Application Data

(60) Provisional application No. 60/796,415, filed on May 1, 2006.

(51) Int. Cl.
*G06F 17/30* (2006.01)
*G06F 17/10* (2006.01)
*G06F 17/00* (2006.01)
*G06F 7/48* (2006.01)

(52) U.S. Cl. .......................... 701/124; 701/3
(58) Field of Classification Search ............... 701/124; 702/176
See application file for complete search history.

(56) References Cited

U.S. PATENT DOCUMENTS

| 4,446,524 | A | * | 5/1984 | Wendt | 701/124 |
| 4,639,872 | A | * | 1/1987 | McHale et al. | 701/124 |
| 4,935,885 | A | * | 6/1990 | McHale et al. | 702/175 |
| 5,214,586 | A | * | 5/1993 | Nance | 701/124 |
| 5,548,517 | A |   | 8/1996 | Nance | |

(Continued)

FOREIGN PATENT DOCUMENTS
WO    WO 2006093992 A2 *  9/2006

OTHER PUBLICATIONS

Aircraft Weight and Balance Handbook, 1999, United States Department of Transportation Federal Aviation Administration, FAA-H-8083-1.*

*Primary Examiner* — Khoi Tran
*Assistant Examiner* — Dale Moyer
(74) *Attorney, Agent, or Firm* — Robert A. Voight, Jr.; Winstead P.C.

(57) ABSTRACT

A method, system and computer program product for determining an estimate of the weight and balance of an aircraft automatically in advance and up to the point of take-off. A weight and balance system may receive information from a flight operating system, a reservation system, a bag loader and/or a pilot in advance and up to the point of take-off. The information received from the flight operating system, the reservation system, the bag loader and/or pilot is used to estimate the weight and balance of an aircraft automatically in advance and up to the point of take-off, such as via software. For example, the flight operating system may provide information related to fuel, weather, airplane, airports, and flight information. The reservation system may provide information related to passenger and bag information. The bag loader may provide additional information related to bag information.

42 Claims, 3 Drawing Sheets

U.S. PATENT DOCUMENTS

| | | |
|---|---|---|
| 6,128,951 A | 10/2000 | Nance |
| 6,237,406 B1 | 5/2001 | Nance |
| 6,237,407 B1 | 5/2001 | Nance |
| 6,308,131 B1 * | 10/2001 | Fox ................................ 701/124 |
| 6,923,375 B2 | 8/2005 | Stefani |
| 2002/0055816 A1 * | 5/2002 | Chamas et al. ................ 701/124 |
| 2004/0226996 A1 * | 11/2004 | Stefani ........................... 235/384 |
| 2008/0243561 A1 * | 10/2008 | Deygout et al. .................... 705/5 |

\* cited by examiner

DETERMINING AN ESTIMATE OF THE WEIGHT AND BALANCE OF AN AIRCRAFT AUTOMATICALLY IN ADVANCE AND UP TO THE POINT OF TAKE-OFF

CROSS-REFERENCE TO RELATED APPLICATIONS

This application is related to the following commonly owned U.S. patent application:

Provisional Application Ser. No. 60/796,415, "Method and Apparatus for Determining Flight Information," filed May 1, 2006, and claims the benefit of its earlier filing date under 35 U.S.C. §119(e).

TECHNICAL FIELD

The present invention relates to the field of computing an aircraft's weight and balance, and more particularly to determining an estimate of the weight and balance of an aircraft automatically in advance and up to the point of take-off.

BACKGROUND INFORMATION

Currently, aircraft weight and balance estimates are used to avoid overloading an airplane and avoiding weight imbalances for safety considerations. The current Federal Aviation Administration (FAA) advisory, which is used by most airlines, require the airlines to use estimated passenger and/or passenger baggage weights. For example, the average passenger and/or passenger baggage weight estimates provide generally, that the average passenger weight, including carry-on luggage, is 190 lbs. Check-in bags are presumed to weigh 30 lbs. These estimates have been used by the pilot to manually determine if the weight and balance of the airplane is within safety margins as discussed below.

A pilot may use a manual balance calculator, referred to as an "E6B," or, commonly referred to as a "wiz-wheel," to determine if the weight and balance of the airplane is within safety margins just prior to take-off. Typically, the passenger area of the airplane is divided into three sections or zones, such as "zone A" referring to the front portion of the airplane, "zone B" referring to the middle portion of the airplane, and "zone C" referring to the rear portion of the airplane. The pilot receives, often manually, the number of passengers that have checked-in in each of the zones (e.g., 10 passengers sitting in zone A, 30 passengers sitting in zone B and 10 passengers sitting in zone C). The pilot may also receive information, such as the number of children out of these passengers and which zones the children are sitting. This may be important information as children are estimated to weigh 87 lbs. instead of 190 lbs. The pilot manually alters the wiz-wheel taking into consideration this information.

The pilot also takes into consideration the weight of the cargo. As the passenger area of the airplane may be divided into sections or zones, the cargo area may be divided into sections or zones. For example, the cargo area may be divided into four zones, such as "zone A" referring to the front portion of the cargo area, "zone B" referring to the front to middle portion of the cargo area, "zone C" referring to the middle to rear portion of the cargo area, and "zone D" referring to the rear portion of the cargo area. The pilot receives the number of checked-in bags in each of the cargo area zones. The pilot may further receive information, such as the number of checked-in bags in each cargo area zone that are classified as being "large" and hence use an estimated weight of 60 lbs instead of 30 lbs. The pilot manually alters the wiz-wheel taking into consideration this information.

The pilot also takes into consideration the amount of fuel on board. The pilot may obtain this information from a fuel gauge in the cockpit. Again, the pilot manually alters the wiz-wheel taking into consideration this information. The amount of fuel on board is very important in determining where the aircraft center of gravity lies. Typically, as more fuel is placed on board the airplane, the center of gravity is moved further back towards the rear of the airplane as fuel is typically held in the wings, which point towards the rear of the airplane. Center of gravity, as used herein, may refer to the point at which the entire weight of the airplane may be considered as concentrated so that if supported at this point the airplane would remain in equilibrium in any position.

Once the pilot has performed a number of mathematical calculations and inputted this information into the wiz-wheel by adjusting and readjusting the wiz-wheel, the pilot is able to determine whether the aircraft's balance is safe for take-off.

The pilot or planner may want to continuously gather information (e.g., cargo information, passenger information) and hence continuously make such calculations in order to get a more accurate determination as to whether the weight and balance of the airplane is within safety margins. If, however, such calculations could automatically (such as via software) be made continuously, in real-time, and distributed to those who need to know, such as via a web-based interface, it would greatly save time for the pilot or planner. Further, if such calculations could automatically (such as via software) be made continuously, in real-time, and distributed to those who need to know, it would minimize potential errors since the information is not "manually" being inputted into a manual balance calculator.

Therefore, there is a need in the art to determine an estimate of the weight and balance of an aircraft automatically in advance of take-off and up to the point of take-off, in which the information needed for the weight and balance calculation is provided continuously, in real time, up to the point of departure.

SUMMARY

The problems outlined above may at least in part be solved in some embodiments by receiving information from a flight operating system, a reservation system, a bag loader and/or a pilot in advance and up to the point of take-off. The information received from the flight operating system, the reservation system, the bag loader and/or pilot is used to estimate the weight and balance of an aircraft automatically in advance and up to the point of take-off, such as via software. For example, the flight operating system may provide information related to fuel, weather, airplane, airports, and flight information. The reservation system may provide information related to passenger and bag information. The bag loader may provide additional information related to bag information.

In one embodiment of the present invention, a method for determining an estimate of the weight and balance of an aircraft automatically in advance and up to point of take-off, the method comprises the step of receiving information from a flight operating system, where the information received from the flight operating system comprises fuel, weather, airplane and flight information. The method further comprises receiving information from a reservation system, where the information received from the reservation system comprises passenger and bag information. Furthermore, the method comprises calculating an estimate of a weight and a balance of an aircraft in advance of take-off using the information received from the flight operating system, and the information received from the reservation system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for determining an estimate of the weight and balance of an aircraft automatically in advance and up to the point of take-off. In one embodiment of the present invention, a weight and balance system may receive information from a flight operating system, a reservation system, a bag loader and/or a pilot in advance and up to the point of take-off. The information received from the flight operating system, the reservation system, the bag loader and/or pilot is used to estimate the weight and balance of an aircraft automatically in advance and up to the point of take-off, such as via software. For example, the flight operating system may provide information related to fuel, weather, airplane, airports, and flight information. The reservation system may provide information related to passenger and bag information. The bag loader may provide additional information related to bag information.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
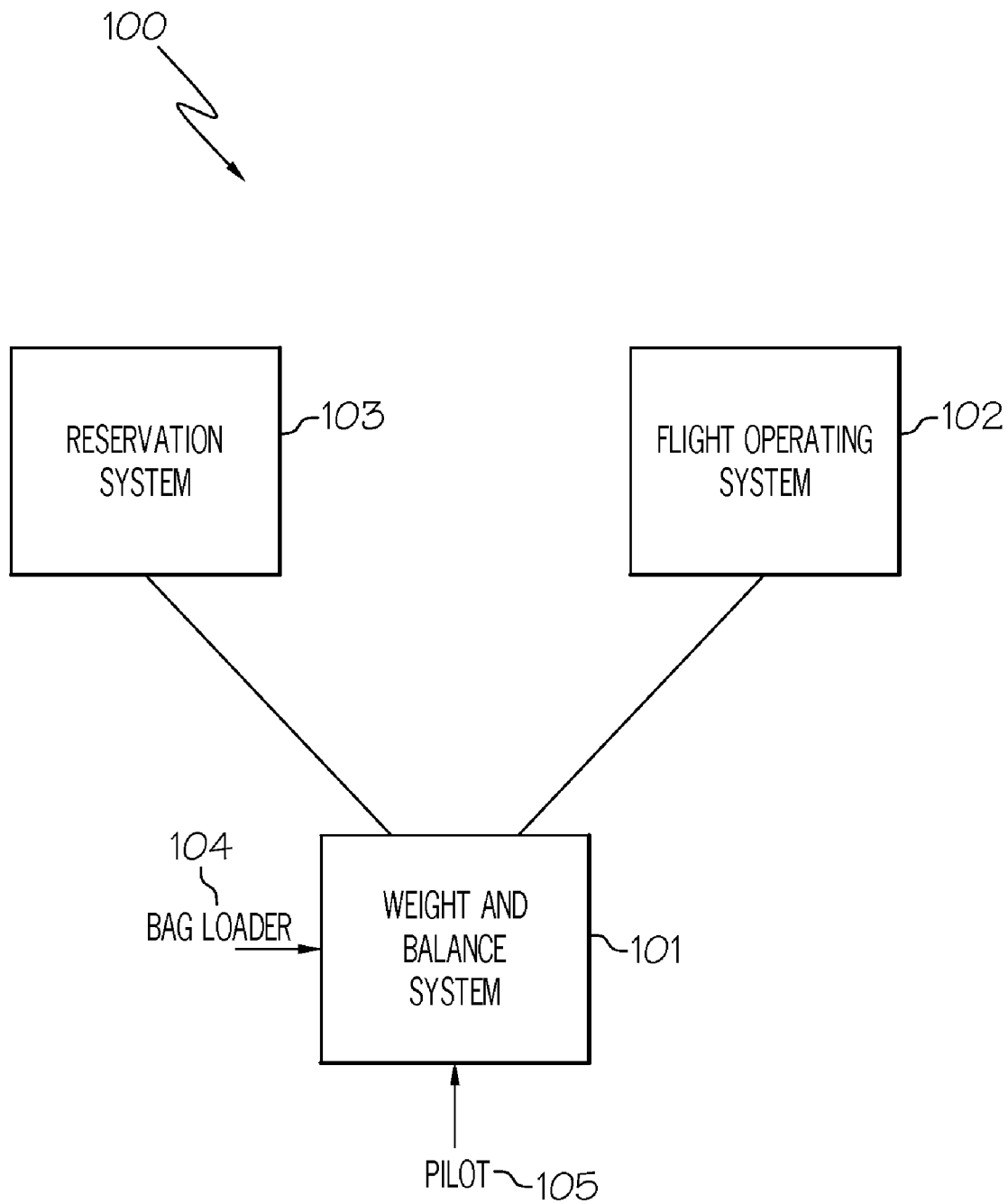
FIG. 1 illustrates an embodiment of the present invention illustrating the various inputs to the weight and balance system.

FIG. 1—Inputs to Weight and Balance System

FIG. 1 illustrates an embodiment of the present invention of a system 100 of devices used for calculating an estimate of the weight and balance of an aircraft. Referring to FIG. 1, system 100 may include a weight and balance system 101 configured to calculate an estimate of the weight and balance of an aircraft. Weight and balance system 101 calculates an estimate of the weight and balance of an aircraft based on information received from a flight operating system 102, a reservation system 103, a bag loader 104 and/or a pilot 105 as discussed further below. Flight operating system 102, reservation system 103, bag loader 104 and pilot 105 may each be connected to weight and balance system 101 wirelessly or via wire. Further, flight operating system 102, reservation system 103, bag loader 104 and pilot 105 may each be connected to weight and balance system 101 over a network (e.g., Local Area Network (LAN), Wide Area Network (WAN)). A more detail description of the hardware configuration of weight and balance system 101 is described below in connection with FIG. 2. A method for determining an estimate of the weight and balance of aircraft by weight and balance system 101 automatically in advance and up to the point of take-off is described further below in connection with FIG. 3.

As discussed above, system 100 may include flight operating system 102. Flight operating system 102 is configured to maintain information relating to but not limited to fuel, weather, airports, passenger, aircraft, flight details, etc. For example, flight operating system 102 may be configured to maintain information relating to the amount of fuel an aircraft is expected to contain at take-off. Flight operating system 102 may further be configured to maintain information on the equipment type (e.g., Boeing™ 737) and identification of the aircraft in question. Identification of the aircraft includes information such as the weight of the aircraft after the aircraft was last serviced. This is important as the aircraft may have had maintenance that required a new part (e.g., generator) which may have a different weight than the original part.

Flight operating system 102 may further be configured to maintain information relating to flight details, such as the airport of destination. Knowing the place of destination may be important in enabling a calculation of how much fuel the aircraft is expected to contain upon arrival of the destination. The calculation of how much fuel the aircraft is expected to contain upon arrival of the destination is important in determining the center of gravity of the aircraft. As fuel is used, the center of gravity typically moves forward towards the front of the airplane. The center of gravity moves forward towards the front of the airplane during a flight since there is less weight in the wings pointing towards the rear of the airplane.

Flight operating system 102 may further be configured to maintain information related to air temperature, wind speed, wind direction and air pressure. Weather-related information is important in determining weight limits on take-off. For example, the less wind resistance, the less weight an airplane can safely take-off with.

Further, flight operating system 102 may further be configured to maintain information related to runways available for take-off. Each runway may have a different wind speed, wind direction, etc., which is taken into consideration in determining a safe weight for the aircraft to take-off.

As discussed above, system 100 may include reservation system 103. Reservation system 103 (e.g., Sabre™ reservation system) is configured to maintain information relating to bag and passenger information. For example, reservation system 103 may be configured to maintain information related to a count of the passengers and children booked to fly the aircraft. In another example, reservation system 103 may be configured to maintain information related to a count of the passengers and children with assigned seats for each zone (e.g., zones A, B, C) in the passenger area of the aircraft. In another example, reservation system 103 maintains information related to a count of the passengers and children checked-in for each zone (e.g., zones A, B, C) in the passenger area of the aircraft.

Additionally, reservation system 103 may maintain information related to the number of bags checked-in. Reservation system 103 may further include information related to the classification (e.g., large size, domestic, international) of those checked bags.

System 100 may further include a person or collection of persons, referred to herein as the "bag loader" 104, that directly or indirectly input information to weight and balance system 101. Bag loader 104 may input information related to the number and classification of bags checked-in for each zone (e.g., zones A, B, C, and D) in the cargo area of the aircraft. Bag loader 104 may input such information via any means, such as wireless or wired. For example, bag loader 104 may input such information into weight and balance system 101 via a personal digital assistant which is wirelessly connected to weight and balance system 101. In another example, bag loader 104 may input such information into weight and balance system 101 via a keyboard.

As discussed above, system 100 may further include pilot 105. Pilot 105 has the ability to modify the estimate of the weight and balance calculated by weight and balance system 101, such as by taking into consideration information that the pilot believes weight and balance system 101 has not taken into consideration in calculating the estimated weight and balance of the aircraft. For example, pilot 105 may instruct (e.g., directly or indirectly input a command to weight and balance system 101) weight and balance system 101 to take into consideration "performance factors," such as the fact that the aircraft is operating under "anti-icing" mode (referring to when a certain portion of the power from the airplane engines are redirected to heating the engines) which results in the aircraft having less power on take-off. In another example of a performance factor, pilot 105 may instruct weight and balance system 101 to take into consideration flying out of a different runway than the aircraft was scheduled to take-off. In another example of a performance factor, pilot 105 may provide a different head wind than weight and balance system 101 used in estimating the weight and balance of the aircraft. Pilot 105 may feel that the information provided to weight and balance system 101 underestimated the wind speed and would prefer weight and balance system 101 to take into consideration a higher estimated wind speed.

The discussion above in connection with the information maintained and provided to weight and balance system 101 by flight operating system 102, reservation system 103, bag loader 104 and pilot 105 is not to be limited in scope. That is, the list of various types of information maintained and provided to weight and balance system 101 by flight operating system 102, reservation system 103, bag loader 104 and pilot 105 is not intended to be an exhaustive list.

Referring to FIG. 1, weight and balance system 101 is configured to calculate an estimated weight and balance of an aircraft in advance and up to the point of take-off using various information received from flight operating system 102, reservation system 103, bag loader 104 and/or pilot 105 (referring to any information maintained by flight operating system 102, reservation system 103, bag loader 104 and/or pilot 105). Further, weight and balance system 101 is configured to continuously update this calculation by polling flight operating system 102, reservation system 103, bag loader 104 and pilot 105 for updates. Weight and balance system 101 compares this calculation with acceptable weights and balances for the aircraft taking into consideration various factors discussed above, such as the weather, wind speed, etc., in order to determine whether the calculated weight and balance of the aircraft is within safety margins and hence safe to take-off. Other outputs from weight and balance system 101 include outputting an estimate amount of additional fuel the aircraft can carry within safety constraints. Carrying additional fuel than required may be advantageous to the air carrier if the price of fuel at the destination is much higher than the price of fuel at the place of origination. Further, weight and balance system 101 may output an updated number of authorized boarding passes to issue. For example, weight and balance system 101 may determine that the aircraft may now safely fly with an additional passenger while still being within safety margins.

As discussed above, a more detail description of the hardware configuration of weight and balance system 101 is discussed below in connection with FIG. 2.

Figure 2:
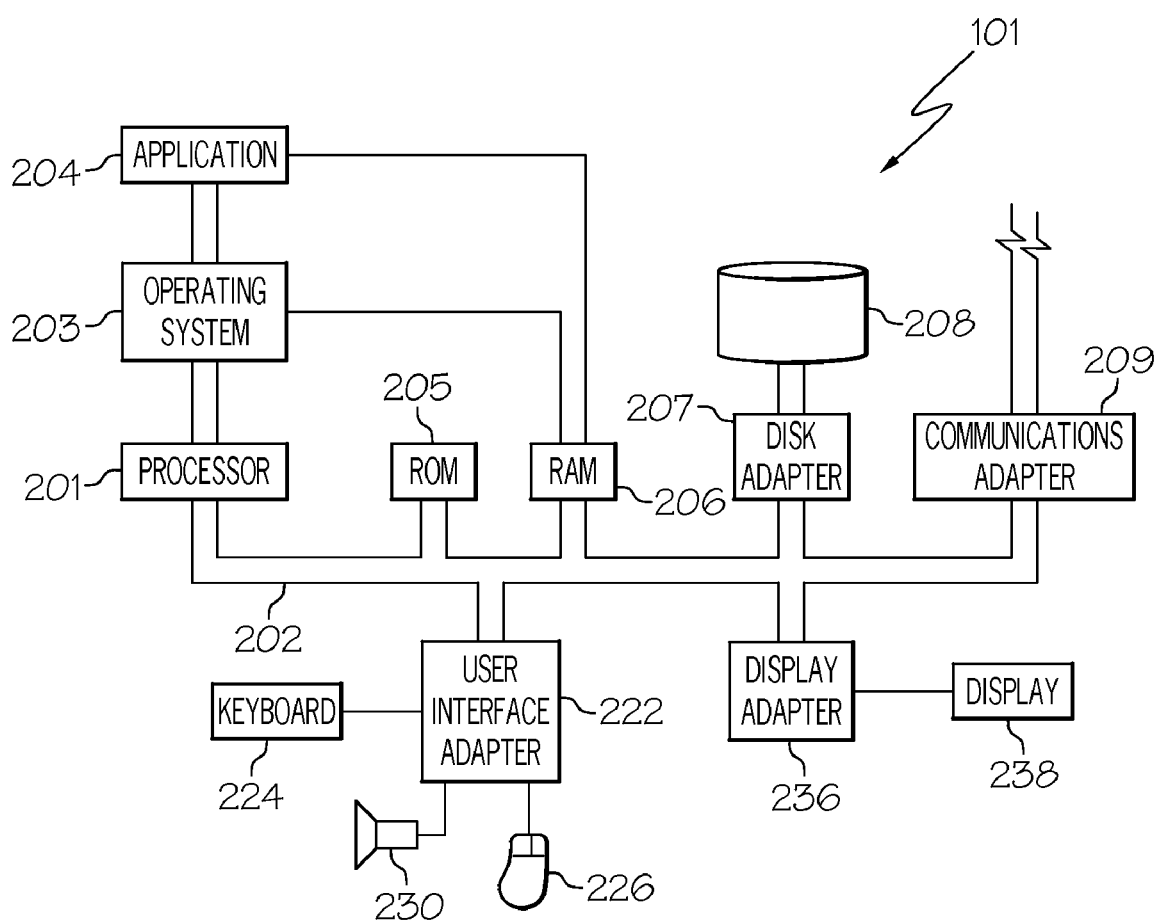
FIG. 2 illustrates a hardware configuration of the weight and balance system in accordance with an embodiment of the present invention.

FIG. 2—Hardware Configuration of Weight and Balance System

FIG. 2 illustrates an embodiment of a hardware configuration of weight and balance system 101 (FIG. 1) which is representative of a hardware environment for practicing the present invention. Weight and balance system 101 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, an application for determining an estimate of the weight and balance of an aircraft automatically in advance and up to the point of take-off as discussed below in association with FIG. 3.

Referring to FIG. 2, Read-Only Memory (ROM) 205 may be coupled to system bus 202 and include a basic input/output system ("BIOS") that controls certain basic functions of weight and balance system 101. Random access memory (RAM) 206 and disk adapter 207 may also be coupled to system bus 202. It should be noted that software components including operating system 203 and application 204 may be loaded into RAM 206, which may be weight and balance system's 101 main memory for execution. Disk adapter 207 may be an integrated drive electronics ("IDE") adapter that communicates with a disk unit 208, e.g., disk drive. It is noted that the application for determining an estimate of the weight and balance of an aircraft automatically in advance and up to the point of take-off, as discussed below in association with FIG. 3, may reside in disk unit 208 or in application 204.

Referring to FIG. 2, weight and balance system 101 may further include a communications adapter 209 coupled to bus 202. Communications adapter 209 may interconnect bus 202 with an outside network, e.g., Local Area Network (LAN), Wide Area Network (WAN), enabling weight and balance system 101 to communicate with other such systems (e.g., flight operating system 102, reservation system 103, bag loader 104, pilot 105).

I/O devices may also be connected to weight and balance system 101 via a user interface adapter 222 and a display adapter 236. Keyboard 224, mouse 226 and speaker 230 may all be interconnected to bus 202 through user interface adapter 222. Data may be inputted to weight and balance system 101 through any of these devices. A display monitor 238 may be connected to system bus 202 by display adapter 236. In this manner, a user is capable of inputting to weight and balance system 101 through keyboard 224 or mouse 226 and receiving output from weight and balance system 101 via display 238 or speaker 230.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 3:
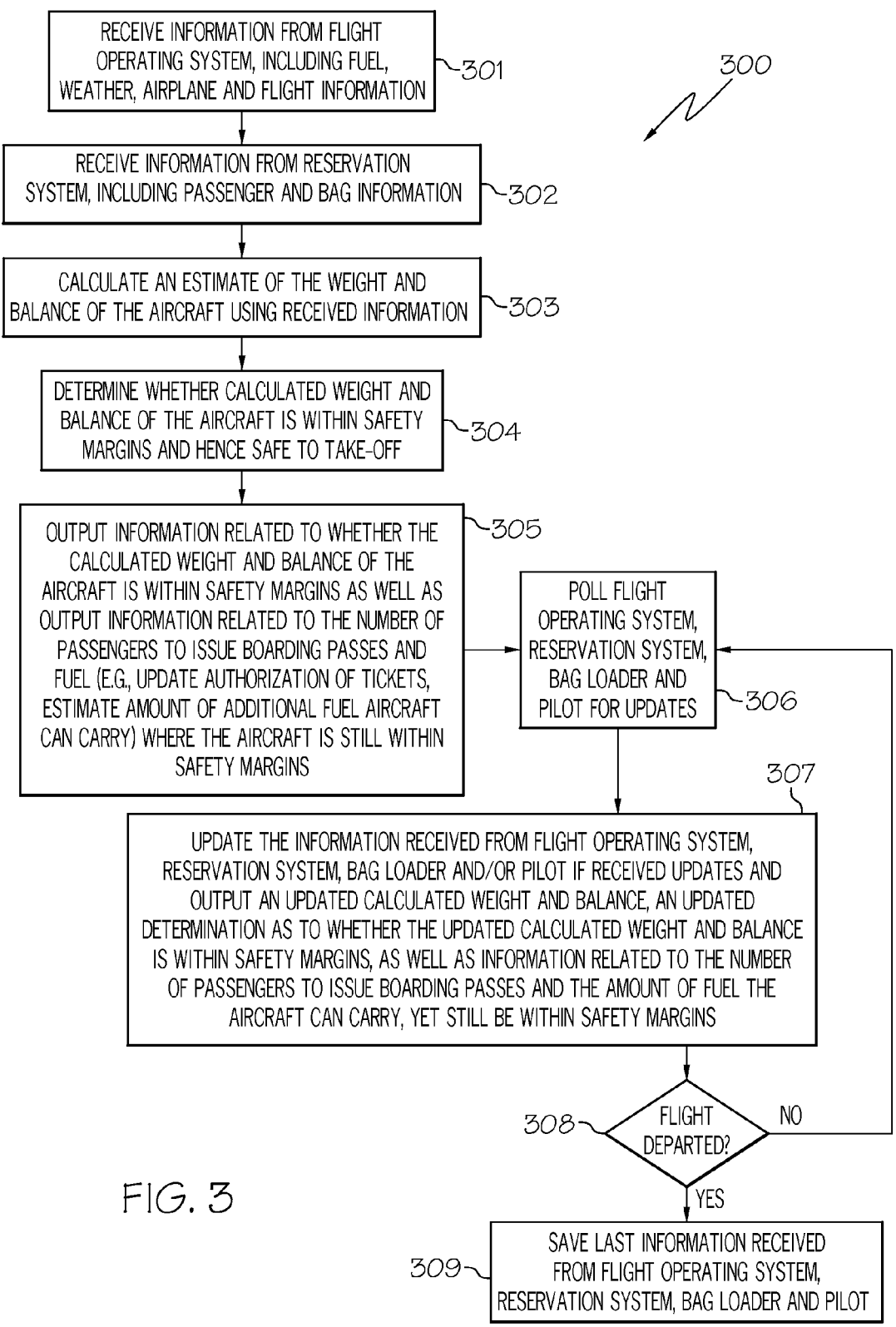
FIG. 3 is a flowchart of a method for determining an estimate of the weight and balance of an aircraft automatically in advance and up to the point of take-off in accordance with an embodiment of the present invention.

FIG. 3—Method for Determining an Estimated Weight and Balance of an Aircraft

FIG. 3 is flowchart of a method 300 for determining an estimate of the weight and balance of an aircraft automatically in advance and up to the point of take-off in accordance with an embodiment of the present invention.

Referring to FIG. 3, in conjunction with FIGS. 1-2, in step 301, weight and balance system 101 receives information from flight operating system 102, including fuel, weather, airplane, airports, and flight information. In one embodiment, weight and balance system 101 receives this information from flight operating system 102 in advance of take-off, such as an hour before the estimated take-off. As discussed above, flight operating system 102 can provide various types of information to weight and balance system 101 to be used by weight and balance system 101 to calculate the estimated weight and balance of an aircraft. Examples of such information include: information relating to the amount of fuel an aircraft is expected to contain at take-off; equipment type; weight of the aircraft after the aircraft was last serviced; flight details (e.g., airport of destination); air temperature; wind speed; wind direction; air pressure; available runways, etc. It is noted that the list of information received from flight operating system 102 is not intended to be exhaustive but illustrative of the types of information flight operating system 102 can provide to weight and balance system 101.

In step 302, weight and balance system 101 receives information from reservation system 103, including passenger and bag information. In one embodiment, weight and balance system 101 receives this information from reservation system 103 in advance of take-off, such as an hour before the estimated take-off. As discussed above, reservation system 103 can provide various types of information to weight and balance system 101 to be used by weight and balance system 101 to calculate the estimated weight and balance of an aircraft. Examples of such information include: a count of the passengers and children booked to fly the aircraft; count of the passengers and children with assigned seats for each zone (e.g., zones A, B, C) in a passenger area of the aircraft; count of the passengers and children checked-in for each zone (e.g., zones A, B, C) in the passenger area of the aircraft; the number of bags checked-in; and the classification (e.g., large size, domestic, international) of the bags checked-in. It is noted that the list of information received from reservation system 103 is not intended to be exhaustive but illustrative of the types of information reservation system 103 can provide to weight and balance system 101.

In step 303, weight and balance system 101 calculates an estimate of the weight and balance of the aircraft in advance of take-off using the information received in steps 301 and 302. Calculating an estimate of the weight and balance of an aircraft is well known in the art and hence will not be described in detail for the sake of brevity.

In step 304, weight and balance system 101 determines if the calculated weight and balance of the aircraft is within safety margins and hence safe to take-off. Determining whether the calculated weight and balance of the aircraft is within safety margins is well known in the art and hence will not be described in detail for the sake of brevity.

In step 305, weight and balance system 101 outputs various information, such as whether the calculated weight and balance of the aircraft is within safety margins. Weight and balance system 101 may further output information related to the number of passengers to issue boarding passes and the amount of fuel the aircraft can carry, yet still be within safety margins. For example, weight and balance system 101 may output an estimate amount of additional fuel the aircraft can carry within safety constraints. Carrying additional fuel than required may be advantageous to the air carrier if the price of fuel at the destination is much higher than the price of fuel at the place of origination. Further, weight and balance system 101 may output an updated number of authorized boarding passes to issue. For example, weight and balance system 101 may determine that the aircraft may now safely fly an additional passenger while still being within safety margins.

In step 306, weight and balance system 101 polls flight operating system 102, reservation system 103, bag loader 104 and pilot 105 for updates. In step 307, weight and balance system 101 updates the information received from flight operating system 102, reservation system 103, bag loader 104 and/or pilot 105 if received updates and outputs an updated calculated weight and balance, an updated determination as to whether the updated calculated weight and balance is within safety margins, as well as information related to the number of passengers to issue boarding passes and the amount of fuel the aircraft can carry, yet still be within safety margins.

For example, weight and balance system 101 may receive updated information from bag loader 104. Weight and balance system 101 may receive this information in advance of take-off, such as fifteen minutes prior to take-off. As discussed above, bag loader 104 can provide various types of information to weight and balance system 101 to be used by weight and balance system 101 to calculate the estimated weight and balance of an aircraft. Examples of such information include: the number and classification of bags checked-in for each zone (e.g., zones A, B, C, and D) in the cargo area of the aircraft. This information may be important as the bag information provided by reservation system 103 may not include classification information (e.g., how many of the checked-in bags are classified as being large). It is noted that the list of information received from bag loader 104 is not intended to be exhaustive but illustrative of the types of information bag loader 104 can provide to weight and balance system 101.

In another example, weight and balance system 101 may receive updated information from reservation system 103 where an updated passenger list is provided. For instance, customers may miss their flights (e.g., miss their connecting flights) or additional passengers may be added to the flight (e.g., passengers flying stand-by may be added to the flight). By having a different number of passengers on the flight, the weight and balance of the aircraft is affected.

In step 308, weight and balance system 101 determines if the flight for the aircraft (referring to the aircraft whose weight and balance, weight and balance system 101 calculated) has departed. If the flight has not departed, then, in step 306, weight and balance system 101 polls flight operating system 102, reservation system 103, bag loader 104 and pilot 105 for updates.

If, however, the flight has departed, then, in step 309, weight and balance system 101 saves the last information received from flight operating system 102, reservation system 103, bag loader 104 and pilot 105.

It is noted that method 300 may include other and/or additional steps that, for clarity, are not depicted. It is further noted that method 300 may be executed in a different order presented and that the order presented in the discussion of FIG. 3 is illustrative. It is further noted that certain steps in method 300 may be executed in a substantially simultaneous manner (e.g., steps 301-302) or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for determining an estimate of the weight and balance of an aircraft automatically in advance and up to point of take-off, the method comprising the steps of:
    receiving information from a flight operating system, wherein said information received from said flight operating system comprises fuel, weather, airplane and flight information;
    receiving information from a reservation system, wherein said information received from said reservation system comprises passenger and bag information;
    calculating, by a processor, an estimate of a weight and a balance of an aircraft in advance of take-off using said information received from said flight operating system and said information received from said reservation system; and
    updating authorization of number of boarding passes to issue.

2. The method as recited in claim 1 further comprising the step of:
    polling said flight operating system, said reservation system and a bag loader for updates.

3. The method as recited in claim 1 further comprising the step of:
    saving last information received from said flight operating system, said reservation system and a bag loader after take-off.

4. The method as recited in claim 1, wherein said information received from said flight operating system comprises equipment type and identification of said aircraft, wherein said identification of said aircraft comprises information regarding a weight of said aircraft after said aircraft was last serviced.

5. The method as recited in claim 1, wherein said information received from said flight operating system comprises an estimated amount of fuel said aircraft is expected to contain at take-off.

6. The method as recited in claim 5, wherein said information received from said flight operating system comprises a destination thereby enabling a calculation of how much expected fuel said aircraft is expected to contain upon arrival of said destination, wherein said calculation of how much expected fuel said aircraft is expected to contain upon arrival of said destination is taken into consideration to determine a center of gravity of said aircraft.

7. The method as recited in claim 1, wherein said information received from said flight operating system comprises temperature, wind speed, wind direction and air pressure.

8. The method as recited in claim 1, wherein said information received from said flight operating system comprises runways available for take-off.

9. The method as recited in claim 1, wherein said information received from said reservation system comprises a count of passengers and children booked to fly said aircraft, a count of passengers and children with assigned seats for each zone in a passenger area of said aircraft, and a count of passengers and children checked-in for each zone in said passenger area of said aircraft.

10. The method as recited in claim 1, wherein said information received from said reservation system comprises a number of bags checked-in.

11. The method as recited in claim 2 further comprising the step of:
    receiving information from said bag loader, wherein said information received from said bag loader comprises a number and a classification of bags checked-in for each zone in a cargo area of said aircraft.

12. The method as recited in claim 1 further comprising the step of:
    receiving input from a pilot modifying said calculated estimate of said weight and said balance of said aircraft.

13. The method as recited in claim 12, wherein said input received from said pilot comprises performance factors.

14. The method as recited in claim 1 further comprising the step of:
    outputting an estimated amount of additional fuel said aircraft can carry within safety constraints.

15. A system, comprising:
    a memory unit for storing a computer program for determining an estimate of the weight and balance of an aircraft automatically in advance and up to point of take-off;
    a processor coupled to said memory unit, wherein said processor, responsive to said computer program, comprises:
        circuitry for receiving information from a flight operating system, wherein said information received from said flight operating system comprises fuel, weather, airplane and flight information;
        circuitry for receiving information from a reservation system, wherein said information received from said reservation system comprises passenger and bag information;
        circuitry for calculating an estimate of a weight and a balance of an aircraft in advance of take-off using said information received from said flight operating system and said information received from said reservation system; and
        circuitry for updating authorization of number of boarding passes to issue.

16. The system as recited in claim 15, wherein said processor further comprises:
    circuitry for polling said flight operating system, said reservation system and a bag loader for updates.

17. The system as recited in claim 15, wherein said processor further comprises:
    circuitry for saving last information received from said flight operating system, said reservation system and a bag loader after take-off.

18. The system as recited in claim 15, wherein said information received from said flight operating system comprises equipment type and identification of said aircraft, wherein said identification of said aircraft comprises information regarding a weight of said aircraft after said aircraft was last serviced.

19. The system as recited in claim 15, wherein said information received from said flight operating system comprises an estimated amount of fuel said aircraft is expected to contain at take-off.

20. The system as recited in claim 19, wherein said information received from said flight operating system comprises a destination thereby enabling a calculation of how much expected fuel said aircraft is expected to contain upon arrival of said destination, wherein said calculation of how much expected fuel said aircraft is expected to contain upon arrival of said destination is taken into consideration to determine a center of gravity of said aircraft.

21. The system as recited in claim 15, wherein said information received from said flight operating system comprises temperature, wind speed, wind direction and air pressure.

22. The system as recited in claim 15, wherein said information received from said flight operating system comprises runways available for take-off.

23. The system as recited in claim 15, wherein said information received from said reservation system comprises a count of passengers and children booked to fly said aircraft, a count of passengers and children with assigned seats for each zone in a passenger area of said aircraft, and a count of passengers and children checked-in for each zone in said passenger area of said aircraft.

24. The system as recited in claim 15, wherein said information received from said reservation system comprises a number of bags checked-in.

25. The system as recited in claim 16, wherein said processor further comprises:
circuitry for receiving information from said bag loader, wherein said information received from said bag loader comprises a number and a classification of bags checked-in for each zone in a cargo area of said aircraft.

26. The system as recited in claim 15 further comprising:
receiving input from a pilot modifying said calculated estimate of said weight and said balance of said aircraft.

27. The system as recited in claim 26, wherein said input received from said pilot comprises performance factors.

28. The system as recited in claim 15, wherein said processor further comprises:
circuitry for outputting an estimated amount of additional fuel said aircraft can carry within safety constraints.

29. A computer program product embodied in a computer readable medium for determining an estimate of the weight and balance of an aircraft automatically in advance and up to point of take-off, the computer program product comprising the programming steps of:
receiving information from a flight operating system, wherein said information received from said flight operating system comprises fuel, weather, airplane and flight information;
receiving information from a reservation system, wherein said information received from said reservation system comprises passenger and bag information;
calculating an estimate of a weight and a balance of an aircraft in advance of take-off using said information received from said flight operating system and said information received from said reservation system; and
updating authorization of number of boarding passes to issue.

30. The computer program product as recited in claim 29 further comprising the programming step of:
polling said flight operating system, said reservation system and a bag loader for updates.

31. The computer program product as recited in claim 29 further comprising the programming step of:
saving last information received from said flight operating system, said reservation system and a bag loader after take-off.

32. The computer program product as recited in claim 29, wherein said information received from said flight operating system comprises equipment type and identification of said aircraft, wherein said identification of said aircraft comprises information regarding a weight of said aircraft after said aircraft was last serviced.

33. The computer program product as recited in claim 29, wherein said information received from said flight operating system comprises an estimated amount of fuel said aircraft is expected to contain at take-off.

34. The computer program product as recited in claim 33, wherein said information received from said flight operating system comprises a destination thereby enabling a calculation of how much expected fuel said aircraft is expected to contain upon arrival of said destination, wherein said calculation of how much expected fuel said aircraft is expected to contain upon arrival of said destination is taken into consideration to determine a center of gravity of said aircraft.

35. The computer program product as recited in claim 29, wherein said information received from said flight operating system comprises temperature, wind speed, wind direction and air pressure.

36. The computer program product as recited in claim 29, wherein said information received from said flight operating system comprises runways available for take-off.

37. The computer program product as recited in claim 29, wherein said information received from said reservation system comprises a count of passengers and children booked to fly said aircraft, a count of passengers and children with assigned seats for each zone in a passenger area of said aircraft, and a count of passengers and children checked-in for each zone in said passenger area of said aircraft.

38. The computer program product as recited in claim 29, wherein said information received from said reservation system comprises a number of bags checked-in.

39. The computer program product as recited in claim 30 further comprising the programming step of:
receiving information from said bag loader, wherein said information received from said bag loader comprises a number and a classification of bags checked-in for each zone in a cargo area of said aircraft.

40. The computer program product as recited in claim 29 further comprising the programming step of:
receiving input from a pilot modifying said calculated estimate of said weight and said balance of said aircraft.

41. The computer program product as recited in claim 40, wherein said input received from said pilot comprises performance factors.

42. The computer program product as recited in claim 29 further comprising the programming step of:
outputting an estimated amount of additional fuel said aircraft can carry within safety constraints.

\* \* \* \* \*